G. H. Strough.
Horse Hay Fork.
Nº 79512          Patented Jun. 30, 1868
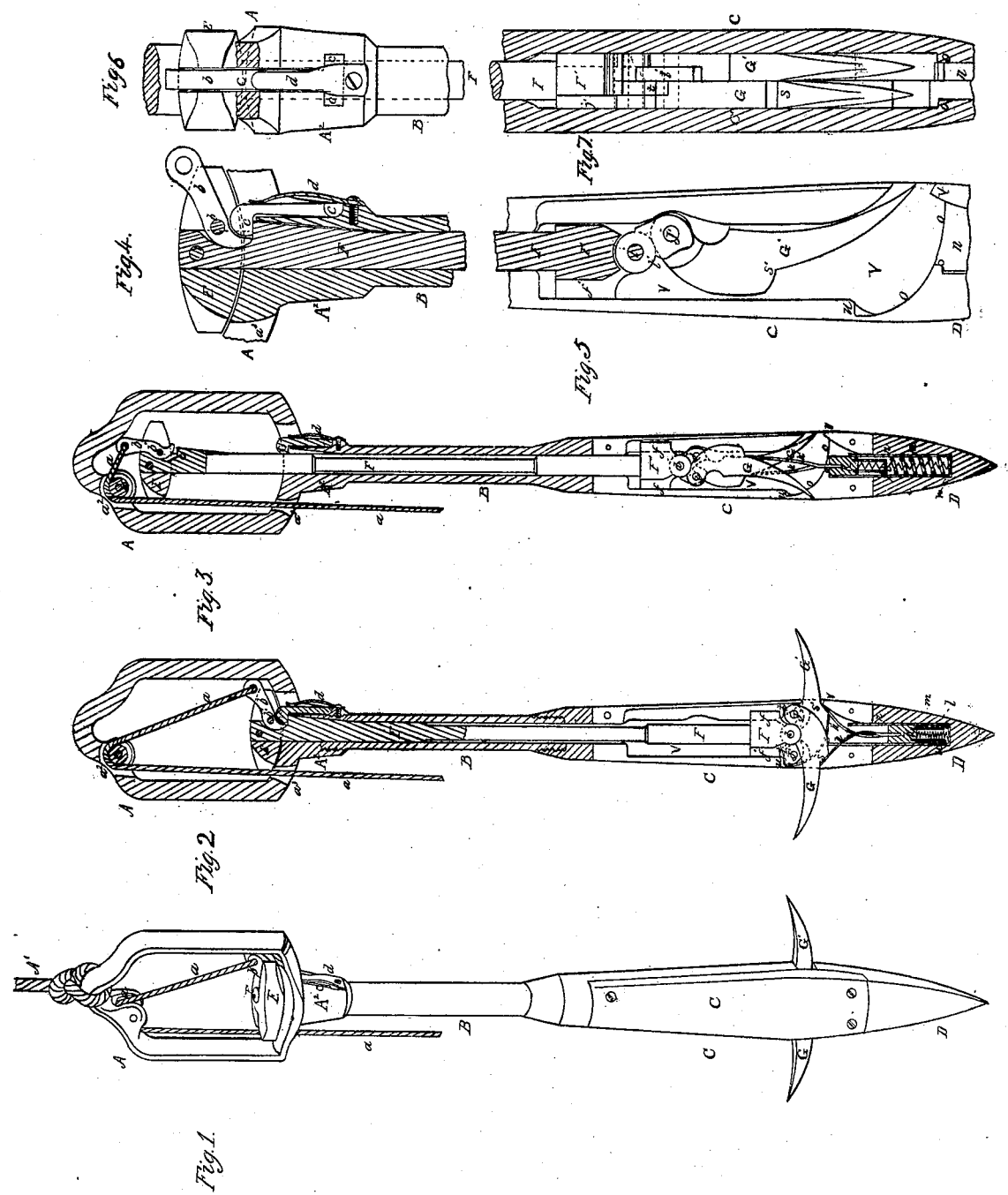
Witnesses
R. J. Campbell
Edw. Schafer
Inventor.
G. H. Strough
by
Mason Fenwick & Lawrence

United States Patent Office.

GEORGE H. STROUGH, OF WATERTOWN, NEW YORK.

Letters Patent No. 79,512, dated June 30, 1868.

---

IMPROVEMENT IN HORSE HAY-FORKS.

---

The Schedule referred to in these Letters Patent and making part of the same.

---

TO ALL WHOM IT MAY CONCERN:

Be it known that I, GEORGE H. STROUGH, of Watertown, in the county of Jefferson, and State of New York, have invented a new and improved Hay-Elevating Fork; and I do hereby declare that the following is a full, clear, and exact description thereof, reference being had to the accompanying drawings, making a part of this specification, in which—

Figure 1 is a perspective view of the fork, as it would appear when suspended by a rope or chain, with its curved tines exposed.

Figure 2 is a diametrical section through the fork, with its tines exposed.

Figure 3 is a similar view of the same parts, showing the tines retracted.

Figures 4, 5, 6, and 7 are enlarged sectional views, in detail, showing more particularly the construction of the several parts composing the improved fork.

Similar letters of reference indicate corresponding parts in the several figures.

This invention relates to certain new and useful improvements on that class of elevating-forks which are designed for use in elevating hay, straw, and other similar substances, into barns, upon stacks, and into wagons, and which are constructed in the form of pointed rods or harpoons, with curved tines or spurs so applied to them that when their pointed ends are plunged into a mass of hay, these spurs can be exposed and made to serve as a means for supporting a large body of hay while being elevated, and when such body is elevated to a proper height, the load can be discharged by retracting the said tines or spurs.

The nature of my invention consists mainly in so constructing the tines or spurs, applying them within recesses formed in the body of the fork, and connecting their heels or inner ends to an actuating-rod, that when the said tines are fully exposed for supporting a load of hay, they will be locked in place, and held securely in such position, so as to sustain the load upon the fork without subjecting the actuating-rod to undue upward pressure, as will be hereinafter explained.

The invention also consists in applying springs within the point of the fork-rod, and in so constructing these springs, that when the actuating-rod is released from its latch, they will operate to retract the tines, and at the same time to force upward the actuating-rod, so as to release the load of hay and allow it to clear itself from the fork, as will be hereinafter explained.

The invention also consists in a novel construction of latching and releasing-devices for the actuating-rod, and in a mode of protecting or guiding such devices, so that they shall not be liable to become casually released while elevating a load, as will be hereinafter described.

To enable others skilled in the art to understand my invention, I will describe its construction and operation.

The body of the fork consists of an open-handle-portion, A, a tubular stem, B, and a swelled portion, C, which latter terminates in a point, D, as shown in the drawings.

The handle A is constructed of the open curved form represented in figs. 1, 2, and 3, so that it can be readily grasped by the handles, and its upper end is constructed with an eye-portion, for the purpose of receiving and having tied to it the rope A', by which the instrument is suspended. An opening, $a^2$, is made through the upper portion of the handle A, with lugs projecting inwardly on each side of it, for receiving a pulley, $a^1$, over which the tripping-rope $a$ passes, which rope also passes down through an opening, $a^3$, made through the lower portion of the handle, as shown in figs. 2 and 3, or, if desired, directly through the openings $a^2$, as in the case of passing it over a fixed pulley between the fork and the hand of the operator.

The tubular stem B is screwed into the tubular neck-portion A, formed on the lower part of the handle, and it is also screwed into the upper contracted end of the hollow enlargement C, upon which the point D is formed. This tube may be made of any suitable length, according to the length required for the fork. It is adapted for receiving through it the actuating-rod F, which is constructed with a slotted T-head, E, upon its upper end, and connected at its lower end to the tines G G', by toggle-joints $t\ t'$.

The enlarged pointed portion C is constructed with recesses V, for receiving the working parts contained in it, and it is also constructed with a removable recessed section, C', for introducing said working parts into their respective places, and also for obtaining access to them for repairs and other purposes. In figs. 1 and 7, this removable section or cap C' is represented in its place, and in figs. 2, 3, and 5, the parts are represented with this section removed.

To the lower end of the actuating-rod F, a foot-piece, F', is secured, having flanges $f f'$ projecting from opposite edges and sides of it, which work in the recess V, and serve as guides for the lower end of said rod F. These foot-pieces also form a line of contact with the tines when the same are exposed, and receive their upward pressure, that would otherwise be imparted to the actuating-rod through the rivets of the toggle-joints. To this foot-piece two short pieces, $t\ t$, are pivoted by a pin, $i$, which crosses the axis of the rod F at right angles to the widest part of the enlargement C, as shown in figs. 2, 3, and 5.

To these pivoted pieces $t\ t'$ the tines G G' are pivoted by pins $j\ j'$, thus connecting the tines to the actuating-rod by means of toggle-joints which will form a lock for the tines when they are exposed, as shown in fig. 2.

Those parts of the tines which are represented as projecting from the opposite sides of the fork-staff in figs. 1 and 2, are curved and pointed, and those parts of the tines which are always enclosed within the recess V are made segmental, or with their edges curved, so as to fit snugly against correspondingly curved shoulders, O, formed at the lower end of the recess V, when the points of the tines are fully exposed and locked in place, as shown in fig. 2. One of the said curved shoulders, $o$, is formed upon the portion C, as shown in figs. 2, 3, and 5, and the other is formed on the inner side of the cap C', as shown in fig. 7; and these shoulders are curved in opposite directions, so as to correspond to the different directions taken by the tines in moving out and in. The shoulders terminate at the openings made for exposing the tines in lips $v$, and at their opposite ends in abutments $n$. In the act of exposing the tines by depressing the actuating-rod F, the curved portions of the tines are directed outwardly by the lips $v$, until the shoulders, $s\ s'$, on the tines are brought against said lips, when, by a further depression of the rod E, the segmental portions of the tines will be brought home against the shoulders $o$, after which the joints $t\ t'$ will be fully extended, and their outer ends brought under the shoulders $u$, as shown in fig. 2. In these positions of the parts, the lips $v$ become the fulcra of the tines, and the shoulders $o\ u$ the points of resistance for sustaining the weight which is brought upon the exposed portions of the tines. It will be seen that when the tines are fully exposed, they will be mainly sustained at two points, the distance between which is nearly equal to the distance across the broadest part of the portion C; and it will also be seen that there will be very little upward pressure brought to act upon the rod F by the weight of the load upon the tines.

When the rod F is released and pressed upward, as will be hereinafter explained, the curved form of the recess $v$ will guide the points of the tines inward, and allow them to be brought entirely within the said recess, as shown in figs. 3, 5, and 7.

In the centre of the point D, a longitudinal recess, $n$, is made, in which slides a block, $k$, having secured to its upper end a forked spring. The forks $h\ h'$ press against their respective tines G G', at the shoulders $s\ s'$, as shown in figs. 2 and 3. Within the recess $n$, two springs, $l$ and $m$, are put, one of which, $m$, is a strong spring for acting upward against block $k$ and springs $h\ h'$, at the commencement of retracting the tines when they have the greatest resistance to overcome. The other spring, $l$, is a comparatively light spring, and is designed to operate in conjunction with the spring $m$, at the commencement of retracting the tines, and also act alone upon said tines and its rod after the spring $m$ ceases to operate. The two springs thus act together to retract the tines when the greatest resistance is to be overcome, after which the lightest spring acts alone to fully retract the tines. By thus employing light and heavy springs, there will not be so much force required to press the rod F down, and thereby expose the tines, as would be found necessary should a single strong spring be used.

On the upper end of the actuating-rod F, a notched T-head is fixed, which is curved on top and bottom, as shown in the drawings, and which has pivoted to it, at $b'$, a hooked tripping-lever, $b$, to the longest arm of which the pull or tripping-rope $a$ is fastened. The hooked short arm of this trip, $b$, works in a recess made into the rod F, just under the head E, and over a nose, $e$, which nose is adapted for receiving a spring-catch, $c$, when the rod F is forced down as far as it will go, as shown in figs. 2, 4, and 6. The catch $c$ is formed on a T-shaped shank, which is rounded and fitted into a corresponding recess made in the circumference of the socket-piece $A^2$ of the handle A, and it is held in this recess by means of a spring, $d$, shown clearly in figs. 3, 4, and 6. The spring $d$ allows the hooked end of the catch to yield and spring over the nose $e$, and at the same time serves to keep the catch in place within its recess without any other fastening.

I have described the point of the fork as being provided with a light and strong spring, and while this construction has superior advantages over a single spring, still, as the result sought may be accomplished by a single spring, I do not wish to be confined to the use of two springs.

I also have shown the supporting-lips $v\ v$ as being fixed or immovable; but inasmuch as they might be made of separate pieces set into the fork, and fastened at their lower ends by pivots, so as to have their upper ends swing in and outward slightly, so as to prevent bind between them and the shoulders of the tines, I do not wish to be confined to fixed or permanent shoulders; although if the parts are accurately fitted to one another, and remain so during use, the fixed shoulders are preferable.

Having described my invention, what I claim as new, and desire to secure by Letters Patent, is—

1. The tines G G', constructed substantially as described, arranged to work in a recess, V, constructed as described, within the sheath or case constituting the body of a pointed fork, and attached to the central rod F by means of pivoted links $t\ t'$, all substantially as herein described.

2. The manner of locking the shanks of the tines G G' between lips $v$ $v$ and shoulders $u$, substantially as described.

3. Effecting the retraction of the tines by means of a spring or springs applied within the pointed portion D of the fork, substantially as described.

4. The arrangement of the pivoted spring-catch $c$, nose $e$, tripping-latch $b$, and cross-head E, substantially in the manner and for the purpose described.

GEO. H. STROUGH.

Witnesses:
A. E. YORK,
NELSON BURDICK.